United States Patent
Reed et al.

(10) Patent No.: US 10,077,042 B2
(45) Date of Patent: Sep. 18, 2018

(54) SYSTEM AND METHOD FOR CONTROLLING BACKLASH IN A VEHICLE POWERTRAIN

(71) Applicant: FORD GLOBAL TECHNOLOGIES, LLC, Dearborn, MI (US)

(72) Inventors: Dennis Craig Reed, Dexter, MI (US); Joshua Nicholas Dewalt, Canton, MI (US); Mary Catherine Farmer, Plymouth, MI (US); Terry Gene Feldpausch, Carleton, MI (US); Peter Douglas Kuechler, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 15/180,219

(22) Filed: Jun. 13, 2016

(65) Prior Publication Data
US 2017/0355360 A1    Dec. 14, 2017

(51) Int. Cl.
*B60W 20/15* (2016.01)
*B60K 6/48* (2007.10)
*F16H 63/50* (2006.01)
*F16H 59/14* (2006.01)

(52) U.S. Cl.
CPC ............ *B60W 20/15* (2016.01); *B60K 6/48* (2013.01); *F16H 63/50* (2013.01); *B60W 2510/0208* (2013.01); *B60W 2510/10* (2013.01); *B60W 2710/02* (2013.01); *B60W 2710/0666* (2013.01); *B60W 2710/083* (2013.01); *F16H 2059/147* (2013.01); *F16H 2059/148* (2013.01)

(58) Field of Classification Search
None
See application file for complete search history.

(56) References Cited

U.S. PATENT DOCUMENTS

| | | | | |
|---|---|---|---|---|
| 5,767,645 A * | 6/1998 | Park | ................. | G05B 19/404 318/280 |
| 6,319,168 B1 * | 11/2001 | Morris | ................. | B60K 6/44 477/5 |
| 6,574,535 B1 * | 6/2003 | Morris | ................. | B60K 6/44 180/65.1 |
| 7,234,552 B2 * | 6/2007 | Prema | ................. | B60K 6/48 180/65.29 |
| 7,577,507 B2 | 8/2009 | Morris | | |
| 7,971,667 B2 | 7/2011 | Yamazaki | | |
| 8,818,660 B2 * | 8/2014 | Heap | ................. | B60K 6/365 180/65.21 |
| 8,954,215 B2 * | 2/2015 | Yamazaki | ................. | B60W 20/00 701/22 |
| 8,965,616 B2 | 2/2015 | Gibson et al. | | |
| 8,968,151 B2 | 3/2015 | Dai et al. | | |

(Continued)

*Primary Examiner* — Nicholas K Wiltey
(74) *Attorney, Agent, or Firm* — David B. Kelley; Brooks Kushman P.C.

(57) ABSTRACT

A system and method for controlling backlash in a vehicle powertrain includes the step of controlling a torque request of the powertrain with a first control strategy after an occurrence of a backlash predictor and before an occurrence of a backlash. Another step may be employed whereby the torque request is controlled with a second control strategy after the first control strategy and before the occurrence of the backlash such that a torque request level is below a highest torque request level obtained during the first control-strategy.

16 Claims, 4 Drawing Sheets

(56) References Cited

U.S. PATENT DOCUMENTS

| | | | |
|---|---|---|---|
| 9,037,329 B2* | 5/2015 | Nefcy | B60L 15/20 |
| | | | 701/22 |
| 9,290,089 B2* | 3/2016 | Xia | B60K 6/365 |
| 9,766,157 B2* | 9/2017 | England, Jr. | G01M 13/02 |
| 2007/0213909 A1* | 9/2007 | Doering | F02D 41/0002 |
| | | | 701/54 |
| 2007/0225888 A1* | 9/2007 | Morris | B60K 6/365 |
| | | | 701/51 |
| 2009/0276137 A1* | 11/2009 | Whitney | F02D 11/105 |
| | | | 701/101 |
| 2010/0174431 A1* | 7/2010 | Fukumura | B60W 40/12 |
| | | | 701/22 |
| 2010/0235027 A1* | 9/2010 | Park | B60W 30/18009 |
| | | | 701/22 |
| 2011/0178691 A1* | 7/2011 | Wang | F02D 41/0002 |
| | | | 701/102 |
| 2012/0265382 A1* | 10/2012 | Nefcy | B60W 10/06 |
| | | | 701/22 |
| 2013/0297110 A1* | 11/2013 | Nefcy | B60L 15/20 |
| | | | 701/22 |
| 2013/0297111 A1* | 11/2013 | Yamazaki | B60W 20/00 |
| | | | 701/22 |
| 2013/0304293 A1* | 11/2013 | Yoshikawa | B60K 6/48 |
| | | | 701/22 |
| 2013/0317687 A1* | 11/2013 | Ito | B60K 6/48 |
| | | | 701/22 |
| 2014/0046517 A1* | 2/2014 | Heap | B60W 10/06 |
| | | | 701/22 |
| 2015/0274147 A1 | 10/2015 | Nefcy et al. | |
| 2016/0102757 A1* | 4/2016 | Ye | B60K 6/445 |
| | | | 701/51 |
| 2017/0355362 A1 | 12/2017 | Reed et al. | |

* cited by examiner

SYSTEM AND METHOD FOR CONTROLLING BACKLASH IN A VEHICLE POWERTRAIN

TECHNICAL FIELD

The present disclosure relates to a system and method for controlling backlash in a vehicle powertrain.

BACKGROUND

In an automotive powertrain, fast and smooth transitions of the driveline's backlash region following a torque increase request can be challenging because of uncertainties in operational parameters such as input torque, driveline friction and the size of the backlash, just to name a few. These uncertainties vary from vehicle to vehicle and even within the same vehicle as it ages. As a result, it may be difficult to determine when the driveline is in the backlash region and when the backlash region has been traversed. One system for detecting a lash zone is described in U.S. Pat. No. 9,037,329, issued on 19 May 2015 and entitled Lash Zone Detection in a Hybrid Electric Vehicle, which is hereby incorporated herein by reference.

Other systems and methods may be employed for determining backlash, but in at least some of these, the adjustments that are made to the driveline torque control the backlash may result in a lowering of the pre-lash requested torque to decrease the rate that the driveline passes through backlash. This decrease in backlash transition rate combined with the uncertainties described above may lead to an unacceptably slow tip-in response to achieve a smooth backlash transition. It would therefore be desirable to have a system and method for controlling backlash in a vehicle powertrain that overcomes at least some of these issues.

SUMMARY

In at least some embodiments, a method for controlling backlash in a vehicle powertrain includes the step of controlling a torque request of the powertrain with a first control strategy after an occurrence of a backlash predictor and before an occurrence of a backlash. Another step may be employed whereby the torque request is controlled with a second control strategy after the first control strategy and before the occurrence of the backlash such that a torque request level is below a highest torque request level obtained during the first control strategy.

In at least some embodiments, a method for controlling backlash in a vehicle powertrain includes the step of controlling a torque request of the powertrain during a first time period after an occurrence of a backlash predictor and before an occurrence of a backlash. After the first time period and before an occurrence of the backlash, the torque request is reduced to a torque request level that is below a torque request level obtained during the first time period.

In at least some embodiments, a system for controlling backlash in a vehicle powertrain includes a control system, including at least one controller. The control system is configured to implement a first control strategy for a torque request after an occurrence of a backlash predictor and before an occurrence of a backlash. The control system is further configured to implement a second control strategy after the first control strategy and before the occurrence of the backlash such that a torque request level is below the torque request level obtained during the first control strategy.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
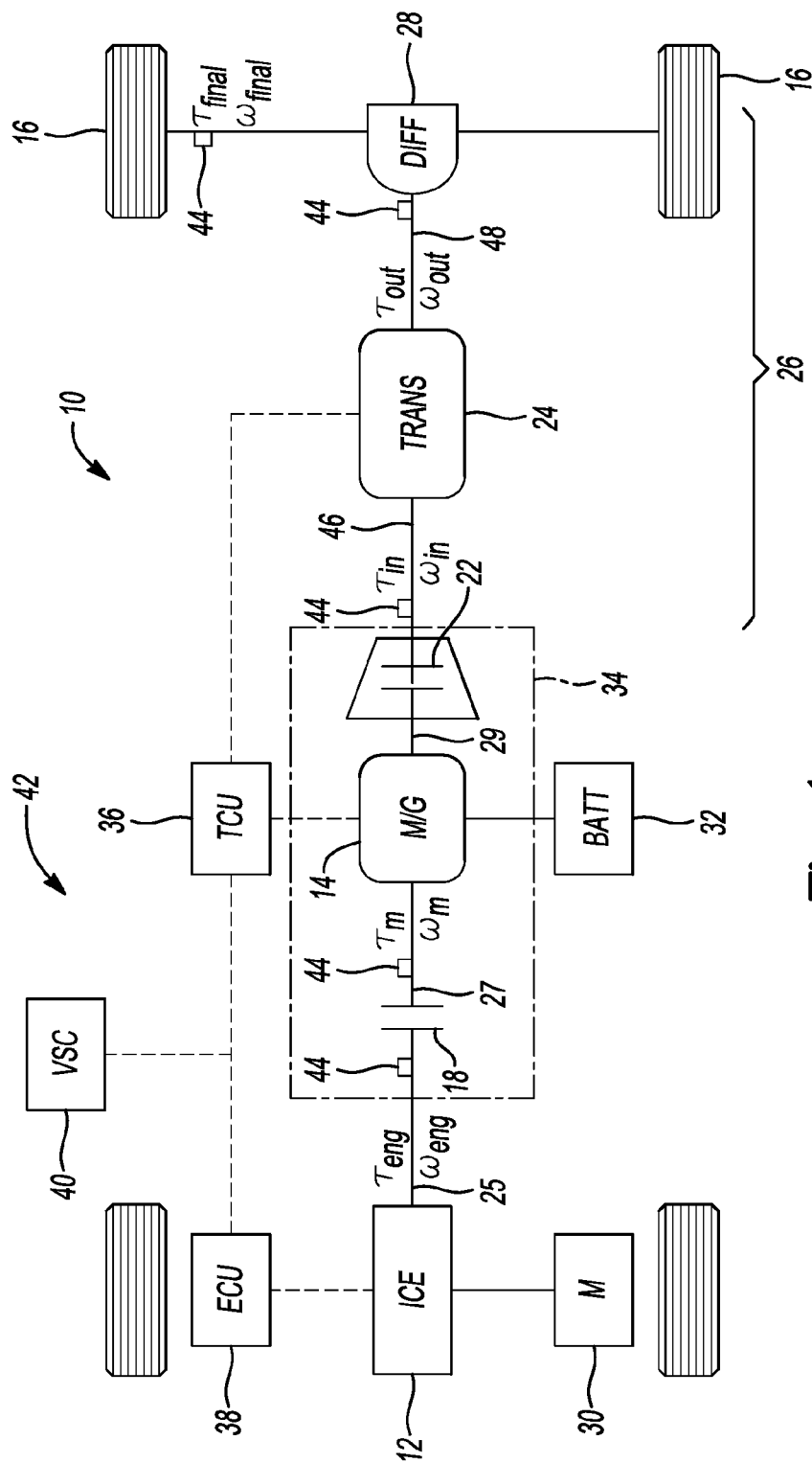
FIG. 1 is a schematic representation of a hybrid electric vehicle including a control system in accordance with embodiments described herein.

FIG. 1 illustrates a schematic diagram of a hybrid vehicle 10 according to an embodiment. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12, to the vehicle wheels 16, or both.

The M/G 14 is connected to the engine 12 using a first clutch 18, also known as a disconnect clutch or the upstream clutch. A second clutch 22, also known as a launch clutch or the downstream clutch, connects the M/G 14 to a transmission 24, and all of the input torque to the transmission 24 flows through the launch clutch 22. Although the clutches 18, 22 are described and illustrated as hydraulic clutches, other types of clutches, such as electromechanical clutches may also be used. Alternatively, the clutch 22 may be replaced with a torque converter having a bypass clutch, as described further below. In different embodiments, the downstream clutch 22 refers to various coupling devices for the vehicle 10 including a traditional clutch, and a torque converter having a bypass (lock-out) clutch. This configuration may use an otherwise conventional automatic step-ratio transmission with a torque converter and is sometimes referred to as a modular hybrid transmission configuration.

The engine 12 output shaft is connected to the disconnect clutch 18, which in turn is connected to the input shaft for the M/G 14. The M/G 14 output shaft is connected to the launch clutch 22, which in turn is connected to the transmission 24. The various components of the vehicle 10 are positioned sequentially in series with one another. The launch clutch 22 connects the vehicle prime movers to the driveline 26. As shown in FIG. 1, the driveline includes the transmission 24, differential 28, vehicle wheels 16, and their interconnecting components. For purposes of powertrain control, and in particular calculating and using driveline twist, the definition of the driveline may be extended to include the engine output shaft 25—i.e., the crankshaft—the input shaft 27 to the M/G 14, and the M/G output shaft 29.

In another embodiment of the vehicle 10, the downstream clutch 22 is a bypass clutch with a torque converter. The input from the M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical or frictional connection between the impeller side and the turbine side for direct torque transfer. The bypass clutch may be slipped and/or opened to control the amount of torque transferred through the torque converter. The torque converter may also include a mechanical lockup clutch.

In the vehicle 10, the launch clutch 22 or bypass clutch for the torque converter may be locked to increase fuel efficiency, and may be locked when crossing a lash zone during a tip in or tip out event. The drivability and control of the effect of lash crossing within the driveline depends on the control of the powertrain torque from the engine 12 and/or the electric machine 14. M/G 14 torque may be controlled to a greater accuracy and with a faster response time than engine 12 torque. During an electric-only mode of operation for the vehicle 10, the M/G 14 torque may be controlled when crossing a lash zone. During a hybrid mode of operation of the vehicle with both the engine 12 and M/G 14 operating, the M/G 14 torque and engine 12 torque may be controlled together in order to improve drivability of the vehicle 10 and reduce the effect of lash crossing in the driveline.

In the representative embodiment illustrated, the engine 12 is a direct injection engine. Alternatively, the engine 12 may be another type of engine or prime mover, such as a port injection engine or fuel cell, or use various fuel sources, such as diesel, biofuel, natural gas, hydrogen, or the like. In some embodiments, the vehicle 10 also includes a starter motor 30 operatively connected to the engine 12, for example, through a belt or gear drive. The starter motor 30 may be used to provide torque to start the engine 12 without the addition of torque from the M/G 14, such as for a cold start or some high speed starting events.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. The M/G 14 may also be placed in a generator configuration to moderate the amount of engine 12 torque provided to the driveline 26. In one example the battery 32 is configured to connect to an external electric grid, such as for a plug-in hybrid electric vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter connected to the battery 32.

In some embodiments, the transmission 24 is an automatic transmission and connected to the drive wheels 16 in a conventional manner, and may include a differential 28. The vehicle 10 is also provided with a pair of non-driven wheels, however, in alternative embodiments, a transfer case and a second differential can be utilized to positively drive all of the vehicle wheels.

The M/G 14 and the clutches 18, 22 may be located within a motor generator case 34, which may be incorporated into the transmission 24 case, or alternatively, is a separate case within the vehicle 10. The transmission 24 has a gear box to provide various gearing ratios for the vehicle 10. The transmission 24 gearbox may include clutches and planetary gearsets, or other arrangements of clutches and gear trains as are known in the art. In alternative embodiments, the transmission 24 is a continuously variable transmission or automated mechanical transmission. The transmission 24 may be an automatic six speed transmission, other speed automatic transmission, or other gearbox as is known in the art.

The transmission 24 is controlled using a transmission control unit (TCU) 36 or the like to operate on a shift schedule, such as a production shift schedule, that connects and disconnects elements within the gear box to control the gear ratio between the transmission output and transmission input. The gear ratio of the transmission 24 is the ideal torque ratio of the transmission 24. The TCU 36 also acts to control the M/G 14, the clutches 18, 22, and any other components within the motor generator case 34.

An engine control unit (ECU) 38 is configured to control the operation of the engine 12. A vehicle system controller (VSC) 40 transfers data between the TCU 36 and ECU 38 and is also in communication with various vehicle sensors. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator assembly 34, the starter motor 30 and the engine 12 under any of a number of different conditions, including in a way that minimizes or reduces the effect of lash crossing in the driveline 26 and impact on the driver during tip in or tip out events.

Under normal powertrain conditions, that is with no subsystems/components faulted, the VSC 40 interprets the driver's demands—e.g., PRND and acceleration or deceleration demand—and then determines the wheel torque command based on the driver demand and powertrain limits. In addition, the VSC 40 determines when and how much torque each power source needs to provide in order to meet the driver's torque demand and to achieve the operating points (torque and speed) of the engine 12 and M/G 14.

The vehicle 10 may have speed sensors 44 positioned at various locations of the powertrain and driveline 26. The speed sensors 44 provide information to the control system 42 regarding the rotational speed of a shaft in approximately real time, although there may be some lag due to response time, and signal and data processing. In the embodiment shown in FIG. 1, there is a speed sensor 44 that measures the speed of the engine output-shaft 25 ($\omega_{eng}$), the speed of the M/G 14 input shaft 27 ($\omega_m$), the speed of the transmission input-shaft 46 ($\omega_{in}$), the speed of the transmission output-shaft 48 ($\omega_{out}$), and the speed of one or both of the axles connected to the wheels 16 ($\omega_{final}$).

As a part of the control strategy or algorithm for operation of the vehicle 10, the control system 42 may make an engine 12 torque request ($\tau_{eng}$), a M/G 14 torque request ($\tau_m$), or both, as shown in FIG. 1. The net transmission input-torque ($\tau_{in}$) is composed of the electric motor torque and engine torque ($\tau_{in}=\tau_m+\tau_{eng}$), assuming that the disconnect and launch clutches 18, 22 are locked. Also show in FIG. 1 is the transmission output-torque ($\tau_{out}$) and the wheel torque ($\tau_{final}$).

In alternative configurations, the clutch 22 may be replaced with a torque converter unit including a torque converter and a lockup clutch or bypass clutch. The torque converter has torque multiplication effects when certain rotational speed differentials exist across the torque converter. During torque multiplication, the output torque of the torque converter is larger than that of the input torque due to torque multiplication across the torque converter. Torque multiplication exists for example, when the vehicle 10 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 22 are equal to one another, and the input and output rotational speeds for the device 22 are equal to one another. A locked clutch eliminates slipping and driveline inefficiency across the torque converter, for example, when the rotational speed ratio across the torque converter is greater than approximately 0.8, and may increase fuel efficiency for the vehicle 10.

Changing torque amounts and/or directions may cause disturbances or oscillation in the driveline 26 associated with lash crossing. Backlash may occur in a vehicle driveline 26 whenever one of the wheel 16 torque and power plant 12, 14 torque change direction from the other. This change in torque direction may occur with the vehicle 10 operating with both the disconnect clutch 18 and the launch clutch 22, or lock out clutch for the torque converter, in a locked or engaged position. For example, when vehicle 10 is decelerating, the compression braking effect of the engine 12 provides negative torque to the transmission 24 which is then passed through the differential 28 and then to the wheels 16. At this point, the driveline 26 is wrapped in the negative direction. If the driver provides a power request, or tip in, using the accelerator pedal, the engine 12 torque switches from negative to positive as it begins to supply torque to propel the vehicle 10 forward. The driveline 26 unwraps, as each driveline component changes from transmitting negative torque to transmitting positive torque. At some point during this transition, the driveline 26 passes through a relaxed state with zero torque applied to the wheels 16.

During this zero torque region, gear teeth in the transmission 24 and/or differential 28 may not be tightly coupled with their mating gears and there may be some play in the driveline 26. Play across multiple sets of gears acts as cumulative. As the engine 12 continues to provide positive torque, the driveline 26 will wrap in the positive direction. The gears may be quickly coupled resulting in a clunk. Also, the axle connecting the differential 28 to a wheel 16 may twist slightly as a result of higher torque on the differential 28 side of the axle compared to the wheel 16 side. The axle may act as a torsional spring to store this energy. As the vehicle 10 begins to accelerate, the wheel 16 torque catches up to the torque at the differential 28, and any energy stored in the axle is released quickly causing an oscillation in the opposite direction, or backlash. The result of this backlash crossing is a clunk or noise when the gear teeth hit together, and a reduction in wheel torque when the axle energy is expended. The clunks and oscillations may be noticed by a driver depending upon their severity. For a driveline with multiple gear meshes arranged in series, each gear mesh may have a lash zone. The lash in the driveline cascades or progresses through the gear meshes. After a gear mesh is engaged, the subsequent gear mesh crosses through a lash zone as the torque reversal goes through. Backlash may include main gear lash as well as subsequent gears.

The scenario described above can also happen in the opposite direction. In this case, the driver would be providing a power request, such as a tip in of the accelerator pedal for vehicle acceleration, and then suddenly removing the power request by releasing the accelerator pedal through a tip out. The driveline 26 goes from being wrapped in the positive direction to being wrapped in the negative direction, with a similar torque dip or hole and clunk during the transition. The effect of the backlash crossing due to sudden acceleration is typically more noticeable than sudden deceleration.

Figure 2A:
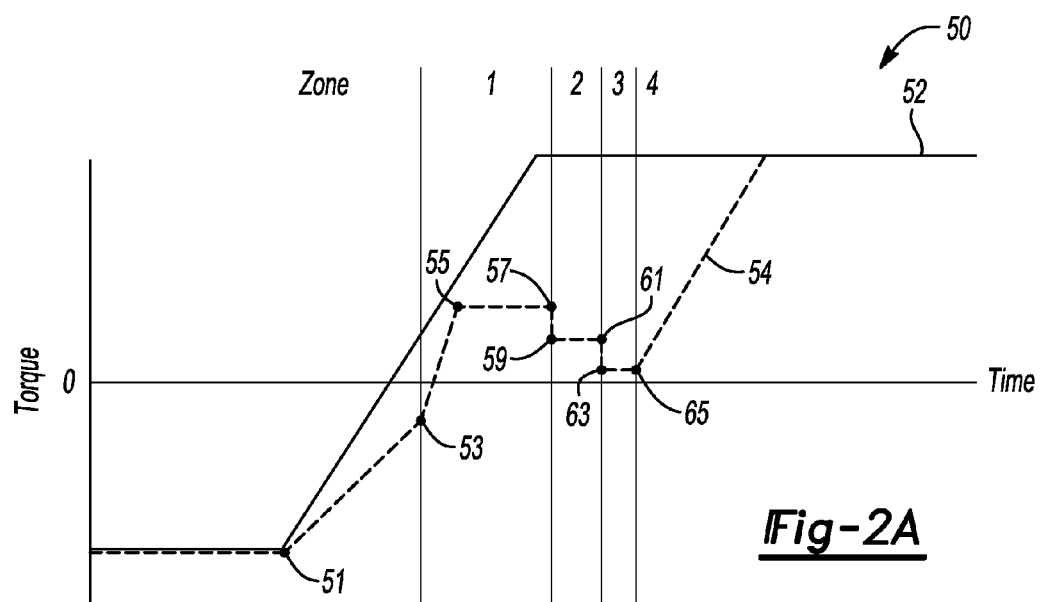
FIGS. 2A and 2B show torque diagrams for the implementation of embodiments of control systems and methods described herein.

FIG. 2A shows a torque diagram 50 for the implementation of control systems and methods associated with embodiments of the invention described herein. Like other control strategies and methods described herein, the control strategy and method associated with the torque diagram 50 in FIG. 2A can be used with vehicle powertrains such as the hybrid electric vehicle powertrain illustrated in FIG. 1, or other hybrid electric, electric, or conventional powertrains. Such powertrains may include engines, transmissions and drive wheels, such as the engine 12, M/G 14, transmission 24 and drive wheels 16 depicted in FIG. 1, or may include different components depending on the configuration. The timeline shown in FIG. 2A is divided into four different zones. The first two zones cover a time period prior to backlash occurring, zone 3 covers the time period during which backlash is occurring, and a zone 4 covers the time period after backlash is complete and the powertrain torque request returns to an unfiltered level.

Figure 2B:
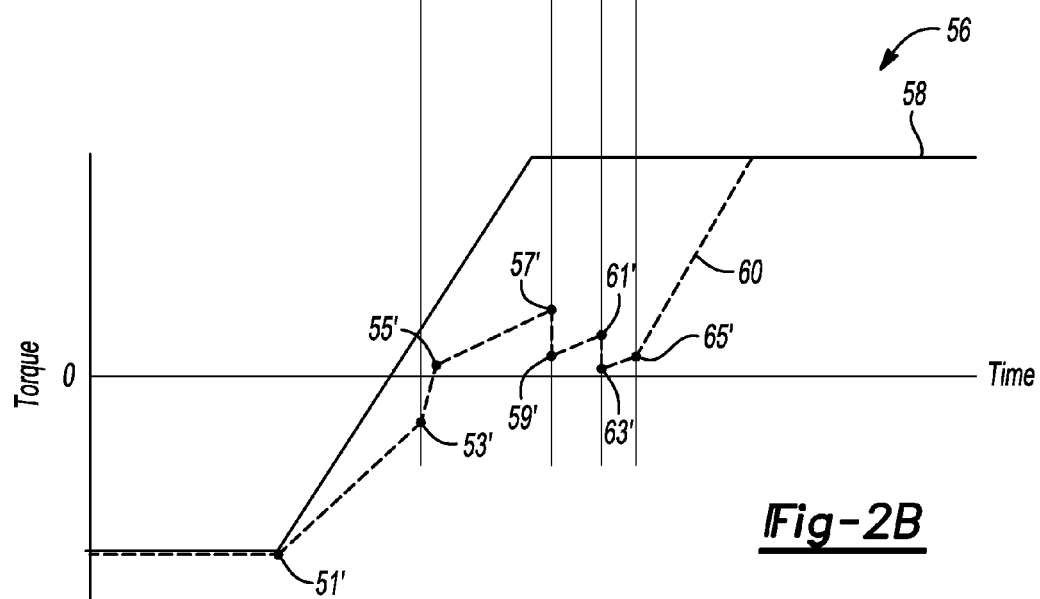

A brief description of FIG. 2A and FIG. 2B is initially provided, and a more detailed description is provided in conjunction with the flowcharts illustrated in FIGS. 3-6. The solid line 52 in diagram 50 shows the driver requested torque; while the dashed line 54 shows the filtered torque request—i.e., the torque request that is controlled in accordance with at least some embodiments of the present invention. In general, this embodiment provides a multi-tier torque request level that quickly increases torque when a torque request is received—e.g., when a tip-in occurs—reduces the torque request level in a second zone, and finally reduces it again during the time that backlash is occurring.

FIG. 2B shows a torque diagram 56 similar to the torque diagram 50 shown in FIG. 2A. The solid line 58 shows the unfiltered driver requested torque, while the dashed line 60 shows the filtered torque request. The difference between the diagrams 50, 56 is that the control strategy described by diagram 50 may be advantageously used when a torque converter or downstream clutch—see element 22 shown in FIG. 1—is open, or transitions from a locked state to an open state, while the control strategy described by diagram 56 may be used when the torque converter or downstream clutch is locked. As shown in the two diagrams 50, 56, both control systems provide a multi-tiered torque request level to address the issue of backlash; however, the torque is held generally constant—albeit at different levels—in each of the first three zones in diagram 50, while it is ramped up through each of the zones in the control system illustrated in diagram 56.

Figure 3:
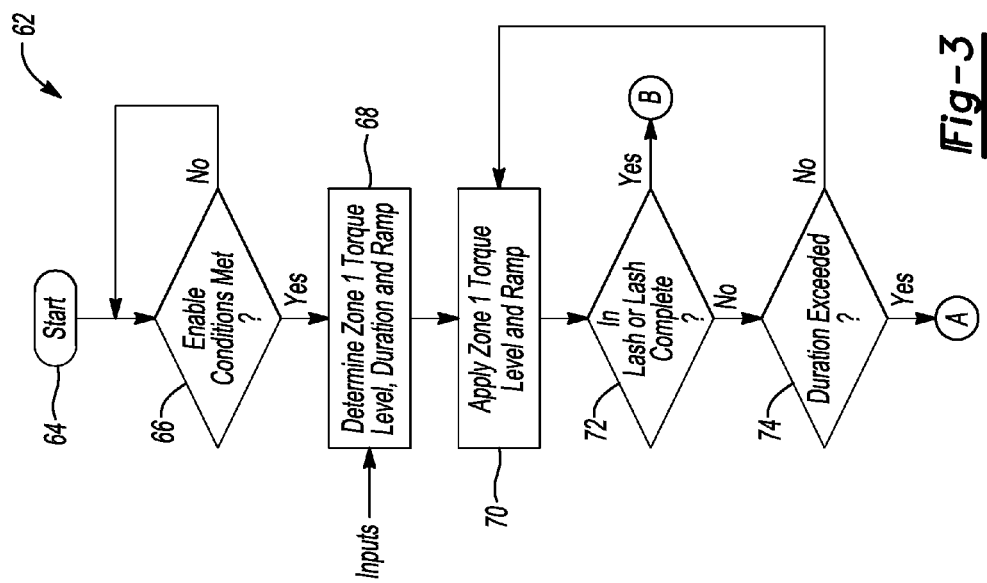
FIG. 3 shows a flowchart illustrating a control strategy in accordance with embodiments described herein for controlling backlash during one time period in the course of the backlash event.

Turning to FIG. 3, a flowchart 62 illustrates a first control strategy in accordance with at least some embodiments of the present invention. In the discussion of the various methods illustrated in the flowcharts in FIGS. 3-6, it is understood that these methods may be implemented by a control system, such as the control system 42 described above, or other vehicle powertrain control systems in different powertrain configurations. The method starts at step 64 and then a determination is made at decision block 66 as to whether certain "enable conditions" are met. In general, this is a determination as to whether the backlash control strategy is needed for the particular situation. One way to view the "enable conditions" is to consider them met when a "backlash predictor" has occurred. There are a number of conditions that indicate a backlash is likely to occur, for example, upon tip-in when a driver torque request is increased, and the current torque level is negative. In this situation, the increase in torque resulting from the tip-in may cause driveline components to engage harshly, leading to an undesirable effect on the vehicle operator. Other situations in which backlash is likely to occur are described above, and include changes in torque direction, the engaging or disengaging of various clutches in the driveline, decreasing vehicle speed and regenerative braking, just to name a few.

If the "enable conditions" are met, the method moves from the decision block 66 to step 68 where certain variables are calculated. In particular, a number of inputs are used to determine the zone 1 torque level, the duration of zone 1, and whether the torque request should be ramped or remain constant. The inputs used for these determinations may include such parameters as the driveline temperature, a current gear of the transmission, the road grade, and the driver requested torque. In addition, the determination of whether or not a ramped torque is desired—i.e. whether the control strategy will follow the filtered torque request 54 shown in the diagram 50, or whether it will follow the filtered torque request 60 shown in diagram 56—will be based on an input as to whether the torque converter or other downstream clutch is open or locked. The driveline temperature may be estimated by using a number of related parameters, such as the transmission oil temperature, the rear differential temperature, and the ambient temperature. The parameters used for the determinations made at step 68 may be entered into a lookup table accessible by the control system to determine a torque level corresponding to the various measured or estimated input parameters.

In the example shown in FIG. 2A, both the filtered torque request 54 and the unfiltered torque request 52 are negative prior to point 51, which occurs before the beginning of zone 1. Therefore, if a tip-in occurs at this point along the timeline, it may be considered that the enable conditions are met. Here the unfiltered torque request 52 increases rapidly until it meets the level of torque requested by the tip-in. In contrast, the filtered torque request 54 increases more slowly until the beginning of zone 1, indicated by the point 53. In the implementation shown in the diagram 50, the beginning of zone 1 is where the torque converter or other downstream clutch begins to open. In contrast, the beginning of zone 1 in diagram 56 is indicated by the point 53' and does not include the torque converter or other downstream clutch opening because the strategy shown in diagram 56 maintains the locked converter or clutch throughout its implementation.

Returning to the flowchart 62 shown in FIG. 3, once the appropriate determinations are made, the torque level is applied at the beginning of zone 1 as shown in step 70. As implemented in the control strategy illustrated in diagram 50, the torque request is quickly raised to a level indicated by point 55, which is a level that will provide a very high probability—given the uncertainties of certain measured parameters as described above—that the driveline will transition into the backlash region if the torque is applied for a sufficient duration. In at least some embodiments, the torque level indicated by point 55 may be 20 Newton meters (Nm), and may be brought to this level as quickly as possible without introducing an undesirable driveline disturbance, and while ensuring that the filtered torque request does not exceed the unfiltered torque request.

As described above, the torque level may be retrieved from a lookup table after the input parameters are known. The lookup table may have torque level values determined based on desired goals for controlling the backlash. The filtered torque request level for zone 1—e.g., the values used in a lookup table—may be obtained by determining the maximum requested torque that can be applied to quickly unwind the driveline and get near to the start of lash, without producing a "torque hole" feel when the torque is dropped to the zone 2 torque, and without allowing the torque request to be too low so as to cause a delay in the torque response. This maximum requested torque may be determined, for example, from empirical data, theoretical models, or some combination.

In the control strategy illustrated in the diagram 50, the torque request level is held constant for the remainder of zone 1; whereas, in the strategy illustrated in the diagram 56, the torque request level increases throughout the duration of zone 1. Initially, there may be a steep increase in the torque request to the point 55', although it is still at a lower torque request level than the torque request level indicated by point 55. As described above, the torque request level may be controlled to increase throughout zone 1 when the converter or other downstream clutch is locked. As shown in the diagram 56, the filtered torque request strategy 60 continues to increase throughout the remainder of zone 1 until it reaches a maximum at point 57'. The rate of increase in the torque request shown in the diagram 56 may be determined by any method effective to achieve the desired torque request control. In at least some embodiments, this determination may be made based in part by the torque delivery uncertainty of the engine, the motor, or both. If, for example, the torque uncertainty is determined to be +/−10 Nm, then the torque rate would be in the range of the entire uncertainty, which is 20 Nm over the entire lash crossing event. If the desired lash crossing event was, for example, 100 milliseconds (ms), then the torque rate would be selected to be in the range between 0 and 200 Nm/s.

The next step in the flowchart 62 shown in FIG. 3 is a determination as to whether the powertrain has entered into a lash zone, or even whether it has entered and traversed the lash zone so that the lash is complete—this is shown at decision block 72. As noted above, embodiments described herein provide systems and methods for controlling backlash, including a period of control during zones 1 and 2 prior to the backlash zone being entered. Even so, it may be that the torque request level is initially raised too high, or that the duration of zone 1 is somewhat too long, in which case the powertrain may enter the lash zone prior to the termination of zone 1. One way to address this issue is to use an adaptive strategy to adjust the backlash control so that the lash zone is not entered until after zone 1 and zone 2 are complete. One such adaptive strategy is described in U.S. patent application publication no. 2017/0355362 entitled: Adaptive Control of Backlash in a Vehicle Powertrain, filed on 14 Jun. 2016, which is hereby incorporated herein by reference.

Figure 4:
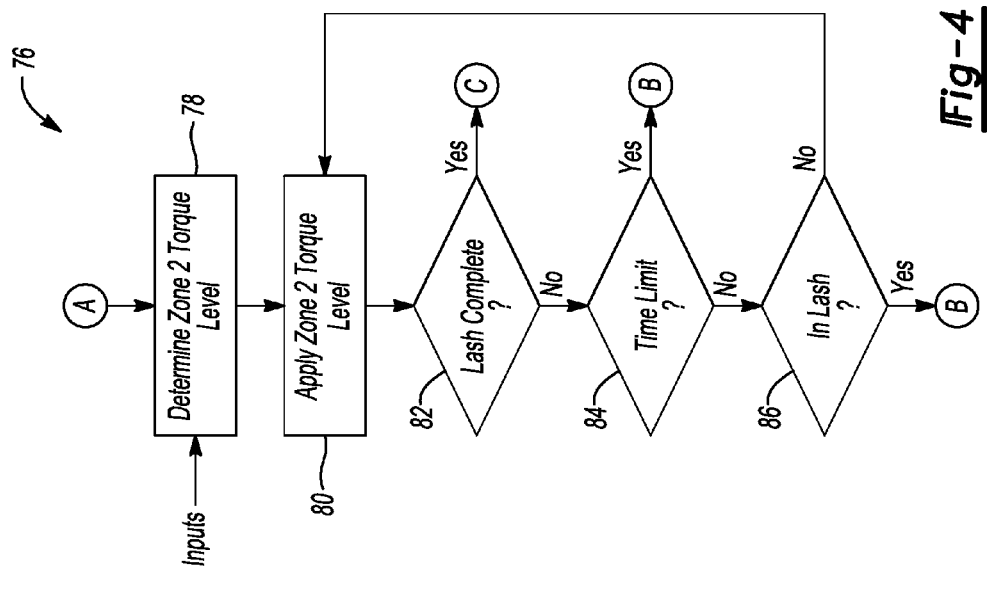
FIG. 4 shows a flowchart illustrating a control strategy in accordance with embodiments described herein for controlling backlash during different time period in the course of the backlash event.
Figure 5:
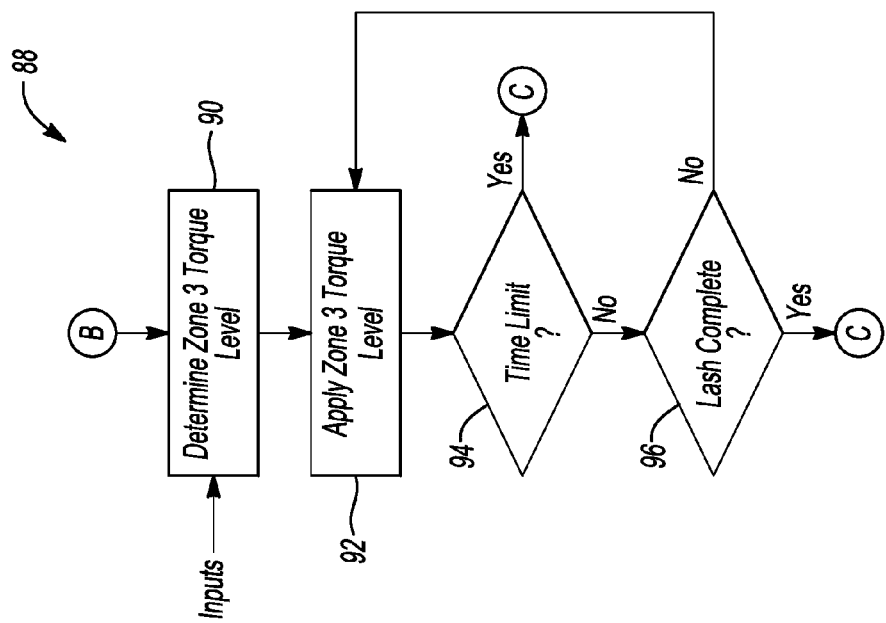
FIG. 5 shows a flowchart illustrating a control strategy in accordance with embodiments described herein for controlling backlash during another time period in the course of the backlash event.

Returning to the embodiment illustrated in FIG. 3, if the determination is made at decision block 72 that the powertrain has entered the lash zone, or that the lash zone is complete, the strategy moves on to the zone 3 control labeled "B" in FIG. 3, and described in detail in conjunction with FIG. 5. If, however, the powertrain does not enter the lash zone during zone 1, a determination is made at decision block 74 as to whether the duration of zone 1 has been exceeded—i.e., whether or not its planned duration is complete. If it has not yet completed its duration, the method loops back to step 70; if the duration is complete, the method moves onto the zone 2 control labeled "A" in FIG. 3 and described in detail in FIG. 4.

In summary, the zone 1 control may include controlling the torque request of the powertrain with a first control strategy, for a first time period—i.e., the zone 1 duration—after the occurrence of the backlash predictor and before actual occurrence of the backlash. In the case where a torque converter or other downstream clutch is not locked, the first control strategy may include increasing the torque request to a first predetermined level—for example, 20 Nm as shown in FIG. 2A—and holding the torque request constant until the torque request is controlled according to a second control strategy, which is shown in zone 2. Thus, a final torque request level indicated by the point 57 is the same as the initial or first predetermined level indicated by the point 55.

In the case where the torque converter or other downstream clutch is locked, the first control strategy may include increasing the torque request at a first rate to a first predetermined level—see, e.g., the filtered torque request 60 moving from the point 53' to the point 55' in FIG. 2B. After reaching the first predetermined level—indicated by the point 55'—the torque request is increased at a second rate that is different from the first rate until the torque request is controlled according to the second control strategy, which is shown in zone 2. In this embodiment, the rate of increase in the torque request level between point 55' and point 57' is different from the rate of increase between point 53' and point 55', and the rate may be determined as described above or by other methods.

Turning to FIG. 4, a flowchart 76 illustrating a second control strategy is shown. The second control strategy is implemented after the first control strategy and before the occurrence of backlash—i.e., it is implemented after the zone 1 control, assuming that the lash zone was not entered during zone 1. Similar to step 68 and the first control strategy, a determination is made at step 78 as to what the desired torque level for the zone 2 control will be. The same or similar inputs may be used to make this determination as were used in the determination at step 68 for the zone 1 control—i.e., driveline temperature, a current gear of the transmission, the road grade, and the driver requested torque, or others. The zone 2 torque request may be obtained, for example, by determining the maximum twist speed for each gear and vehicle speed that will still allow the twist speed from upcoming zone 3 to be achieved following the start of lash. The twist speed is the speed of twisting of the driveline, which can be determined, for example, from the difference between the driveline input speed—i.e., the engine crankshaft speed—to the driveline speed at the wheels. In at least some embodiments, a twist angle may alternatively or also be used.

Once the determination is made at step 78, the torque request level is applied during zone 2 as shown in step 80—this corresponds to the torque request level being reduced and moving from points 57, 57' to the points 59, 59' as shown in the diagrams 50, 56, respectively. As shown in FIGS. 2A and 2B, the torque request level at zone 2 is below the highest torque request level obtained during the first control strategy of zone 1. Similar to the zone 1 strategy, the zone 2 control strategy holds the torque request constant throughout the duration of zone 2 if the converter or other downstream clutch is open, such as shown in the diagram 50; conversely, the torque request level is increased throughout the zone 2 strategy if the converter or downstream clutch is locked, such as shown in the diagram 56. The rate of increase in the torque request level throughout zone 2—from the point 59' to the point 61'—may be determined as described above with regard to the rate of increase for zone 1, although other ways of determining this rate may be used.

As described above, the inputs received at step 78 will be used to determine the zone 2 torque request level, but in general the torque request level will be reduced after zone 1 and before the lash zone is entered so that once the lash zone is entered, it will be easier to provide a smooth transition through the backlash region. If the torque request was to remain at the level at the end of zone 1, indicated by the points 57, 57', it may be difficult to control the powertrain through the lash region without undesirable driveline disturbances occurring. To continue the example provided above, if the zone 1 maximum torque request level is 20 Nm, it may be reduced at the start of the zone 2 control to a level of approximately 10 Nm.

After the torque request level is applied at step 80 in the flow chart 76 shown in FIG. 4, a determination is made as to whether the powertrain has already entered and completed traveling through a backlash zone—this is illustrated by the decision block 82. If it has, the control strategy moves onto the zone 4 control labeled "C" in FIG. 4 and described in detail in FIG. 6. If the powertrain has not completed the lash zone, the flowchart moves to decision block 84, where it is determined whether the zone 2 time limit has been reached. If it has, the control strategy moves to the zone 3 strategy described in conjunction with FIG. 5. If the time limit has not been reached, a determination is made at decision block 86 as to whether the powertrain has entered the lash zone. If not, the method loops back to step 80 where the zone 2 torque request level is still applied; conversely, if the determination at decision block 86 yields the result that the powertrain is in the lash zone, the control strategy moves to the zone 3 control illustrated in FIG. 5.

In summary, the zone 2 control may include controlling the torque request of the powertrain with a second control strategy, for a second time period—i.e., the zone 2 duration—after the zone 1 control and before occurrence of the backlash. In the case where a torque converter or other downstream clutch is not locked, the second control strategy may include reducing the torque request to a second predetermined level—for example, 10 Nm as shown in FIG. 2A—and holding the torque request constant until the torque request is controlled according to a third control strategy, which is shown in zone 3.

In the case where the torque converter or other downstream clutch is locked, the second control strategy may include reducing the torque request to a second predetermined level see, e.g., the filtered torque request 60 moving from the point 57' to the point 59' in FIG. 2B. After reaching the second predetermined level—indicated by the point 59'—the torque request is increased until the start of backlash, which is shown in zone 3. As shown in FIGS. 2A and 2B, the maximum torque request level in zone 2 is also the final torque request level for that zone, and is indicated by the points 61 and 61', respectively. As is shown in the drawing figures, the final torque request levels are both below their respective maximum torque request levels in zone 1, indicated by the points 57 and 57'.

Turning to FIG. 5, a flowchart 88 illustrating a third control strategy is shown. The third control strategy is implemented after the occurrence of backlash and before the backlash is complete. Similar to step 68 and the first control strategy, a determination is made at step 90 as to what the desired torque level for the zone 3 control will be. The same or similar inputs may be used to make this determination as were used in the determination at step 68 for the zone 1 control—i.e., driveline temperature, a current gear of the transmission, the road grade, and the driver requested torque, or others. In at least some embodiments, the zone 3 torque request may be obtained by determining the maximum twist speed for each gear and vehicle speed that produces an acceptable NVH level at the completion of lash. Once the determination is made at step 90, the torque request level is applied during zone 3 as shown in step 92—this corresponds to the torque request level being reduced and moving from points 61, 61' to the points 63, 63' as shown in the diagrams 50, 56, respectively. As shown in FIGS. 2A and 2B, the torque request level at zone 3 is below the highest torque request level obtained during the second control strategy of zone 2.

Similar to the zone 1 and zone 2 strategies, the zone 3 control strategy holds the torque request constant throughout the duration of zone 2 if the converter or other downstream clutch is open, such as shown in the diagram 50; conversely, the torque request level is increased throughout the zone 3 strategy if the converter or downstream clutch is locked, such as shown in the diagram 56. The rate of torque request level increase may be, for example, determined for zone 3 as it was described above for zone and 1 or zone 2. As described above, the inputs received at step 90 will be used to determine the zone 3 torque request level, but in general the torque request level will be reduced when the lash zone is entered. To continue the example provided above, if the zone 1 maximum torque request level is 20 Nm, and the maximum torque request level is 10 Nm in zone 2, the torque request level may be reduced at the start of the zone 3 control to a level of approximately 5 Nm.

After the torque request level is applied at step 92 in the flow chart 88 shown in FIG. 5, a determination is made at decision block 94 as to whether the zone 3 time limit has been reached. If it has, the control strategy moves to the zone 4 strategy described in conjunction with FIG. 6. If the time limit has not been reached, a determination is made at decision block 96 as to whether the lash is complete. If not, the method loops back to step 92 where the zone 3 torque request level is still applied; conversely, if the determination at decision block 96 yields the result that the lash is complete, the control strategy moves to the zone 4 control illustrated in FIG. 6.

In summary, the zone 3 control may include controlling the torque request of the powertrain with a third control strategy, for a third time period—i.e., the zone 3 duration—after the occurrence of the backlash, but before the backlash is complete. In the case where a torque converter or other downstream clutch is not locked, the third control strategy may include reducing the torque request to a third predetermined level—for example, 5 Nm as shown in FIG. 2A—and holding the torque request constant until the torque request is controlled according to a fourth control strategy, which is shown in zone 4.

In the case where the torque converter or other downstream clutch is locked, the third control strategy may include reducing the torque request to a third predetermined level—see, e.g., the filtered torque request 60 being reduced and moving from the point 61' to the point 63' in FIG. 2B. After reaching the third predetermined level—indicated by the point 63'—the torque request is increased until the torque request is controlled according to the fourth control strategy, which is shown in zone 4. As shown in FIGS. 2A and 2B, the maximum torque request level in zone 3 is also the final torque request level for that zone, and is indicated by the points 65 and 65', respectively. As is shown in the drawing figures, the final torque request levels are both below their respective maximum torque request levels in zone 2, indicated by the points 61 and 61'.

Figure 6:
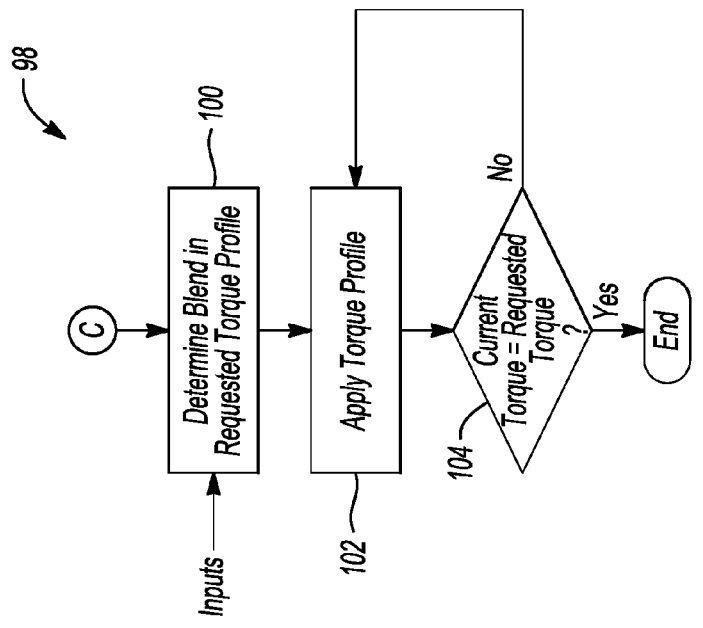
FIG. 6 shows a flowchart illustrating a control strategy in accordance with embodiments described herein during a time period immediately following completion of backlash.

FIG. 6 shows a flowchart 98 illustrating a fourth control strategy in accordance with embodiments described herein. At step 100, a determination is made as to how to blend-in the requested torque from its level at the end of the zone 3 control to the actual torque request as indicated by the lines 52 and 58 in FIGS. 2A and 2B, respectively. In order to make this determination a number of inputs may be used, including the inputs used to determine the other torque levels in the zone 1, 2 and 3 control strategies, including a measurement or estimate of the current torque of the powertrain may also be included. In one such strategy for determining the torque profile, it may be desirable to raise the torque request level from its final level from zone 3—indicated by the points 65, 65', respectively—to the actual torque request level within the time period of one natural frequency of the driveline. This may provide a fast enough return to the torque request level expected by the vehicle operator, while still being implemented in such a way as to reduce or eliminate undesirable driveline disturbances. At step 102, the torque profile is applied, and then at decision block 104 it is determined whether the current torque equals the requested torque. If it does not, the method loops back to step 102 and continues until these torques are equal; at this point the method is complete.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling backlash in a vehicle powertrain, comprising:
   controlling a torque request of the powertrain with a first control strategy after occurrence of a backlash predictor and before occurrence of a backlash; and
   controlling the torque request with a second control strategy after the first control strategy and before the occurrence of the backlash such that a torque request level is below a highest torque request level obtained during the first control strategy, and
   wherein the first control strategy includes one of increasing the torque request to a first predetermined level and holding the torque request constant until the torque request is controlled according to the second control strategy, or increasing the torque request at a first rate to the first predetermined level, and, after reaching the first predetermined level, increasing the torque request at a second rate different from the first rate until the torque request is controlled according to the second control strategy.

2. The method of claim 1, wherein the second control strategy includes increasing the torque request to a second predetermined level and holding the torque request constant until the occurrence of the backlash.

3. The method of claim 1, wherein the second control strategy includes increasing the torque request at a third rate to a second predetermined level, and after reaching the second predetermined level, increasing the torque request at a fourth rate different from the third rate until the occurrence of the backlash.

4. The method of claim 1, wherein the second control strategy includes reducing the torque request from a final torque request level of the first control strategy, and controlling the torque request for a duration of the second control strategy to remain below the final torque request level of the first control strategy.

5. The method of claim 1, further comprising controlling the torque request according to a third control strategy different from the first control strategy and the second control strategy after the occurrence of the backlash such that the torque request level is below the torque request level obtained during the second control strategy.

6. The method of claim 5, wherein the third control strategy includes reducing the torque request from a final torque request level of the second control strategy, and controlling the torque request for a duration of the third control strategy to remain below the final torque request level of the second control strategy.

7. A method for controlling backlash in a vehicle powertrain, comprising:
increasing a torque request of the powertrain during a first time period after an occurrence of a backlash predictor and prior to an occurrence of a backlash; and
reducing the torque request after the first time period and prior to an occurrence of the backlash to a torque request level that is below a torque request level obtained during the first time period.

8. The method of claim 7, wherein increasing the torque request of the powertrain during the first time period includes increasing the torque request at a first rate to a first predetermined level and performing one of: holding the torque request constant or increasing the torque request at a second rate different from the first rate, until the torque request is reduced after the first time period.

9. The method of claim 8, wherein holding the torque request constant occurs when a downstream clutch in the vehicle powertrain is not locked, and increasing the torque request at a second rate different from the first rate occurs when the downstream clutch is locked.

10. The method of claim 7, further comprising holding the torque request constant for a second time period after reducing the torque request after the first time period.

11. The method of claim 7, wherein increasing the torque request of the powertrain during the first time period includes increasing the torque request to a first predetermined level, the method further comprising controlling the torque request to a final level at an end of the first time period.

12. The method of claim 11, wherein the first predetermined level and the final level are substantially equal.

13. The method of claim 11, wherein controlling the torque request to the final level includes increasing the torque request from the first predetermined level to the final level.

14. The method of claim 11, wherein reducing the torque request after the first time period includes reducing the torque request from the final level to a second predetermined level, the method further comprising one of: holding the torque request constant at the second predetermined level or increasing the torque request from the second predetermined level, until the occurrence of the backlash.

15. A system for controlling backlash in a vehicle powertrain, comprising:
a control system, including at least one controller, configured to implement a first control strategy for a torque request after occurrence of a backlash predictor and before occurrence of backlash, and implement a second control strategy after the first control strategy and before occurrence of the backlash such that a torque request level is below the torque request level obtained during the first control strategy, and
wherein the control system is further configured to control the torque request according to a third control strategy after the occurrence of the backlash such that the torque request from a final torque request level of the second control strategy is reduced and the torque request is controlled for a duration of the third control strategy to remain below the final torque request level of the second control strategy.

16. The system of claim 15, wherein the control system implements the second control strategy such that a torque request from a final torque request level of the first control strategy is reduced and the torque request is controlled for a duration of the second control strategy to remain below the final torque request level of the first control strategy.

* * * * *